2,950,986
ULTRAVIOLET LIGHT ABSORBING COMPOSITIONS

Donald L. Bailey, Snyder, and Ronald M. Pike, Grand Island, N.Y., assignors to Union Carbide Corporation, a corporation of New York No Drawing. Filed Aug. 22, 1957, Ser. No. 679,739

15 Claims. (Cl. 117—33.3)

This invention relates to ultraviolet light absorbing compositions. More particularly, it is concerned with new compositions having therein a silicon-containing benzophenone sulfonic acid derivative as an ultraviolet light absorber, and to novel composite articles containing said ultraviolet light radiation absorbers.

It is well known that ultraviolet light radiation, which has a wavelength range between about 2500 and 4000 Angstrom units, has a degradative effect on many commercial products. It is also well known that these radiations can cause severe skin burning on over-exposure of the human body to sunlight. To cut down on the occurrence of these harmful effects, ultraviolet light absorbers have been added to products which will be exposed to ultraviolet light such as plastics and the like, and to suntan lotions and creams which are used on the skin. Among the ultraviolet light absorbers known, there may be mentioned the benzophenones, such as 2,4-dihydroxybenzophenone, 2-hydroxy-4-methoxybenzophenone, 2,2'-dihydroxy-4,4'-dimethoxybenzophenone, sodium 2,4-dihydroxybenzophenone-5-sulfonate, the di-(dialkylamino)benzophenones, the dinitrodialkylaminobenzophenones, and the like.

The use of ultraviolet light absorbers on glass articles to protect the products on display behind the glass pane, or in the glass container, has not heretofore been possible because of the difficulty in obtaining a satisfactory coating on glass due to its inertness. The coatings heretofore obtained on glass products were temporary in nature, and could be readily removed by rubbing or by washing with soap and water.

It has now been found that silicon-containing benzophenone derivatives having the unit represented by the general formula:

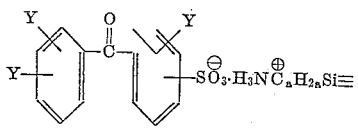

wherein Y can represent hydrogen atoms, hydroxyl radicals, alkyl radicals such as methyl, ethyl, propyl, and the like, alkoxy radicals such as methoxy, ethoxy, and the like, nitro radicals, dialkylamino radicals such as dimethylamino, diethylamino, and the like; and $a$ is an integer having a value of at least 3, and preferably a value of 3 or 4; can be used to produce new compositions which are opaque to ultraviolet light. It has been found that the ultraviolet light absorbing silicon-containing benzophenones are not readily removed from glass surfaces, and can be used to obtain glass articles which are opaque to ultraviolet light radiation. It has also been found that they can be blended into plastic compositions, which are thereby stabilized against the degradative effect of ultraviolet light radiation. These compounds can also be used to prepare suntan lotions and creams.

The compounds suitable for use in the preparation of the ultraviolet light absorbing compositions and composite articles of this invention are the silicon-containing amine salts of the benzophenone sulfonic acids. These compounds and the processes for their production are the subject matter of our co-pending patent application, Serial No. 615,495, filed October 12, 1956. The compounds are produced by the reaction of an aminoalkylsilane or an aminoalkylsiloxane with an unsubstituted or substituted benzophenone sulfonic acid as hereinafter described.

The compounds suitable for use as starting materials in this invention are the monomeric silane amine salts of benzophenone sulfonic acids, which can be represented by the following general formula:

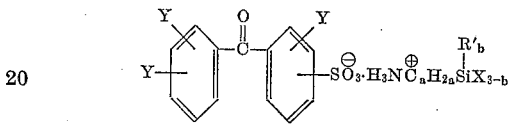

and the siloxane amine salts of benzophenone sulfonic acids, which contain the unit represented by the following general formula:

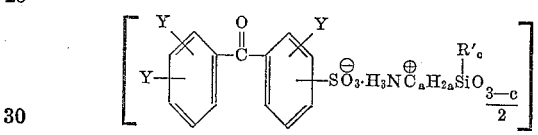

wherein Y and $a$ have the same meanings as hereinbefore indicated; R' represents a hydrocarbon radical such as an alkyl radical, for example, methyl, ethyl, propyl, and the like, an aryl radical such as phenyl, tolyl, and the like, or an aralkyl radical such as benzyl, and the like; X represents an alkoxy radical such as methoxy, ethoxy, and the like, or an aryloxy radical such as phenoxy, and the like; $b$ is an integer having a value of from 1 to 3; and $c$ is an integer having a value of from 0 to 2. These compounds, as disclosed in Serial No. 615,495, are produced by the reaction of an organosilicon compound containing the aminoalkylsilyl group $H_2NC_aH_{2a}Si\equiv$ with a benzophenone sulfonic acid, as represented by the following general equation, wherein benzophenone-4-sulfonic acid is used for illustrative purposes.

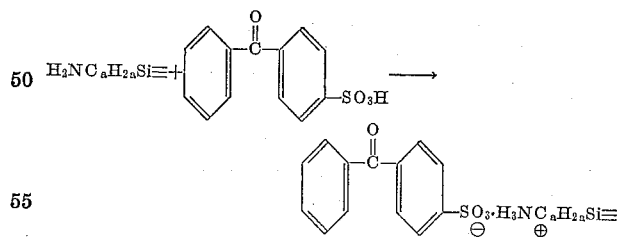

More particularly, suitable aminoalkylsilicon compounds for use as starting materials in producing the amine salts of the benzophenone sulfonic acids are gamma-aminopropyltriethoxysilane, delta-aminobutylmethyldiethoxysilane, gamma-aminopropylmethyldiethoxysilane, gamma-aminopropylphenyldiethoxysilane, delta-aminobutyltriethoxysilane, gamma-aminopropyltrimethylsilane, delta-aminobutyltriethylsilane, modified dimethyl silicone oils containing gamma-aminopropylmethylsiloxy units, delta-aminobutylphenylsiloxy units and the like.

Among the benzophenone sulfonic acids suitable for reaction with the aminoalkylsilicon compounds in producing the amine salts there may be mentioned 2,4-dihydroxybenzophenone-5-sulfonic acid, 4-nitrobenzophenone-2-sulfonic acid, 4-methyl-benzophenone-2'-sulfonic acid, 2,4-dimethylbenzophenone-2'-sulfonic acid, 2,4-dimethyl-3'-nitrobenzophenone sulfonic acid, 4-dimethylaminobenzophenone sulfonic acid, 2,4-dihydroxybenzophenone-4'-sulfonic acid, and the like.

The ultraviolet light absorbing compositions of this invention comprise a base material in combination with the silicon-containing ultraviolet light absorber, and include solutions, creams, lotions, or solid compositions as hereinafter described. The effectiveness of the composition in absorbing ultraviolet light radiations is dependent on the concentration of the silicon-containing amine salt of benzophenone sulfonic acid present in the product to be protected, or upon the thickness of the layer of ultraviolet absorbing silicon-containing amine salt of the benzophenone sulfonic acid deposited on the surface of the film, filament, or other article.

In accordance with this invention, glass panes or bottles can be made opaque to ultraviolet light radiations. This has been accomplished by forming a film of silicon-containing amine salt of a benzophenone sulfonic acid on the surface of the glass article. The film is produced by coating the glass article with a solution of the ultraviolet light absorber, drying the film on the glass surface, and then curing it by heating at an elevated temperature; whereby a tough, clear film, opaque to ultraviolet light is produced on the surface. In producing the film on the glass article, the glass article is dipped into an aqueous solution, or an organic solvent solution, of the silicon-containing amine salt of a benzophenone sulfonic acid at a bath temperature of from about 25° C. to about 100° C. for a period of at least about one minute. Preferred dipping conditions are at bath temperatures of from about 70° C. to about 85° C. to about 2 minutes since under these conditions the clearest films are obtained. Ordinarily bottles and other glass containers are coated on the outside only in order to avoid the possibility of contaminating the product which is to be shipped in the container.

After dipping and drying, the coated glass article is baked at temperatures of at least about 150° C. for a period of at least about 10 minutes. Preferably a temperature of at least about 250° C. is employed in order to satisfactorily bond the film to the glass. Higher temperatures can be used, but care must be exercised that the temperature is not raised so high that degradation of the ultraviolet light absorber takes place. For best results the curing step is preferably carried out at about 250° C. for about 15 minutes, although the film shows no signs of deterioration when heated for about 45 minutes under these conditions. Films baked to glass articles at temperatures above about 225° C. are not readily removed by rubbing or washing with cold water, warm tap water, or cold water containing a soap or detergent.

The concentration of the ultraviolet light absorber in the dipping bath can vary depending on the thickness of the film of ultraviolet light absorber desired on the glass. For example, at a bath concentration of about 0.5% by weight the film on the glass article will be about 4 microns thick, while at a bath concentration of about 2% by weight the film will be about 14 microns thick. Films about 20 microns thick have been found to absorb up to about 98% of the ultraviolet light up to a wavelength of about 3800 Angstroms. As indicated, the thicker the film, the lower will the percent transmission of ultraviolet light radiation be, and the greater will the absorption be. If desired, the glass may first be sized with a sizing agent, such as vinyltriethoxysilane, to obtain better bonding between the glass and the ultraviolet light absorber.

It is also possible by the processes of this invention to produce plastic articles stable to ultraviolet light radiation, for example, vinyl plastics or polyethylene. In stabilizing a plastic material to ultraviolet radiation, from about 0.1 to about 2.5 parts by weight of the silicon-containing amine salt of the benzophenone sulfonic acid can be added to the plastic before it is spun into filaments or extruded into film; or the film, filament, or other plastic article can be coated by dipping into a solution of the ultraviolet light absorber and then drying.

When a plastic film, or fibrous material, is coated with the ultraviolet light absorbing compositions, the coated material may be heated, but to a temperature not exceeding the softening point of the plastic. For example, a polyethylene film should not be heated above about 90° C. When the ultraviolet light absorber is blended into a plastic mass, it may be added in the form of a solution and then the solvent evaporated, or the undiluted compound may be added to the heat softened mass and blended in on a Banbury, a two-roll mill, or like apparatus.

In producing the novel suntan lotions of this invention, a solution of the silicon-containing amine salt of the benzophenone sulfonic acid in a mixture of organic solvents and oils, or in a solvent-water mixture is prepared. It has been found that the solvents which are conventionally used in producing suntan lotions can be used with the silicon-containing amine salts of the benzophenone sulfonic acids to produce the suntan lotions of this invention. Among the suitable solvents are ethanol, isopropanol, glycerine, propylene glycol laurate, mineral oil, propylene glycol, triethanolamine, and the like, which are conventionally used in preparing lotions. Suntan cream compositions can be produced by adding the ultraviolet light absorber to a cream composition prepared in the conventional manner. Among some of the conventional products used in producing suntan cream compositions are stearic acid, propylene glycol, cetyl alcohol, lanolin, mineral oil, beeswax, triethanolamine, and the like.

The following examples further serve to illustrate this invention. Parts are by weight unless otherwise specified.

*Example I*

There was slowly added at 25° C. a solution of 0.71 part of gamma-aminopropyltriethoxysilane, 0.0135 part of triethylamine and 14.25 parts of water to a solution of 0.7 part of 2,4-dihydroxybenzophenone-4'-sulfonic acid in 14.25 parts of water. The reaction which occurred was exothermic and clear yellow solution was produced, which contained the siloxane salt having units represented by the following structural formula:

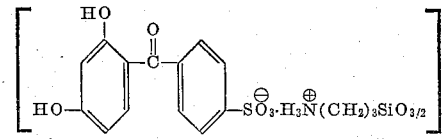

The clear yellow solution of the above-indicated siloxane salt was diluted with water to a total volume of 60 ml. and then heated to about 75° C. A glass slide, which had been washed in hydrochloric acid and then rinsed with distilled water, was immersed in the solution at 75° C. for 2 minutes. The slide was removed, air dried and heated in an oven at 250° C. for 15 minutes to cure. A slightly yellow, clear film, about 7 microns thick on each side, was formed on the slide. This slide is hereinafter designated slide A.

The diluted siloxane salt solution used to coat slide A was further diluted to a total volume of 120 ml. This latter solution was used to coat another glass slide by the same procedure used to coat slide A. A film about 6 microns thick on each side thereof was produced on the second slide. This second slide is hereinafter designated slide B.

The percent transmission of ultraviolet light radiation of both of the above-prepared coated slides was found to be as follows:

| Wavelength, Angstrom Units | Percent Transmission | |
|---|---|---|
| | Slide A | Slide B |
| 3,100 | 1.0 | 4.0 |
| 3,200 | 1.0 | 14.0 |
| 3,300 | 4.0 | 28.0 |
| 3,400 | 10.5 | 34.0 |
| 3,500 | 15.5 | 34.0 |
| 3,600 | 15.5 | 31.5 |
| 3,700 | 13.0 | 31.0 |
| 3,800 | 11.5 | 32.5 |
| 3,900 | 13.0 | |

*Example II*

Delta-aminobutylmethyldiethoxysilane and 2,4-dihydroxybenzophenone-4'-sulfonic acid were reacted by the procedure described in Example I to produce a solution of the siloxane salt containing units which can be represented by the following structural formula:

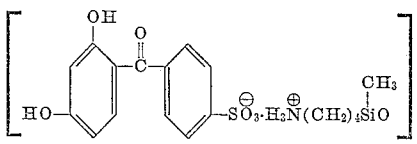

The aqueous solution of this siloxane salt was used to form a coating about 4 microns thick on each side of a glass slide by immersing the glass slide, which had been cleaned as described in Example I, into the solution of ultraviolet light absorber at about 85° C. for about 2 minutes and then air drying and heating the slide in an oven at 250° C. for about 10 minutes. The coated glass slide so obtained exhibited strong ultraviolet light absorption up to about 4000 Angstroms, as illustrated below:

Wavelength, Angstrom units: Percent transmission
3100 _____ 0.42
3200 _____ 0.84
3300 _____ 2.25
3400 _____ 4.00
3500 _____ 5.39
3600 _____ 6.07
3700 _____ 6.64
3800 _____ 7.64
3900 _____ 8.55
4000 _____ 13.20

*Example III*

There was charged 20 grams of copolymer containing 5 parts of combined gamma-aminopropylmethylsiloxy units per 100 parts of the copolymer to a 150 ml. beaker. This copolymer was a colorless silicon oil, which contained mostly combined dimethylsiloxy units in addition to the combined gamma-aminopropylmethylsiloxy units and had an average molecular weight of about 5000. To this copolymer there was added, at about 25° C., 2.47 parts of 2,4-dihydroxybenzophenone-4'-sulfonic acid while continuously stirring the reaction mixture. During the addition the silicone oil became light yellow in color, and very viscous. The viscosity of the reaction mixture was decreased by the addition of 20 ml. of toluene to the mixture. After all of the 2,4-dihydroxybenzophenone-4'-sulfonic acid had been added, the clear, light yellow solution was filtered and the filtrate was concentrated under reduced pressure leaving a light yellow viscous residue weighing 18 g. The residue was an excellent ultraviolet light absorber, showing absorption at wavelengths of from about 2200 to about 3200 Angstroms, and can be represented by the following structural formula:

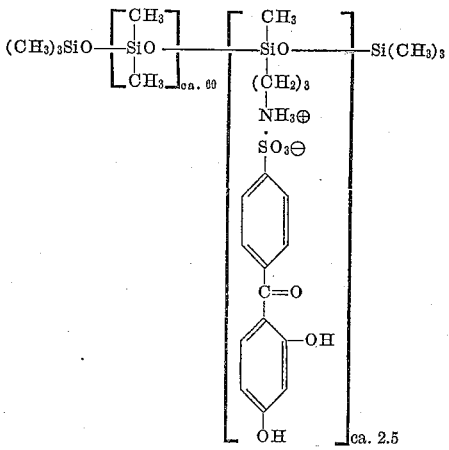

*Example IV*

A solution of 0.83 part of 2,4-dihydroxybenzophenone-4'-sulfonic acid in 20 ml. of water was slowly added to a solution of 1.17 parts of gamma-aminopropylmethyldiethoxysilane in 20 ml. of water. A slightly exothermic reaction occured and a clear, light yellow solution of the amine salt resulted. Added 40 ml. of water to the mixture and the solution was stirred.

A glass slide coated with this formulation, as described in Example I, showed good ultraviolet light absorbing properties up to a wavelength of about 3300 Angstrom units.

Wavelength, Angstrom units    Percent transmission
2900 _____ 0.66
3000 _____ 2.30
3100 _____ 5.27
3200 _____ 5.27
3300 _____ 20.5

*Example V*

A suntan lotion was produced by adding 0.83 part of 2,4-dihydroxybenzophenone-4'-sulfonic acid to a stirred solution of 1.17 parts of gamma-aminopropylmethyldiethoxysilane, 10 parts of glycerine, 10 parts of propylene glycol laurate, 65 parts of ethanol and 13 parts of water. The lotion was a clear, light yellow solution containing siloxane units represented by the general formula:

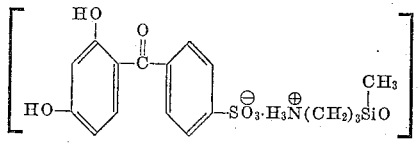

This suntan lotion showed good ultraviolet light absorption properties when tested in a 1 cm. cell at a concentration of 3.812 g./l. in absolute ethanol; results are tabulated below:

Wavelength, Angstrom units    Percent transmission
2200 _____ 6.95
2300 _____ 4.81
2400 _____ 6.34
2500 _____ 13.0
2600 _____ 21.1
2700 _____ 42.8
2800 _____ 38.8
2900 _____ 25.2
3000 _____ 20.0
3100 _____ 25.8
3200 _____ 50.3

What is claimed is:
1. An improved ultraviolet light absorbing composition comprising a base material and a silicon-containing amine salt of a benzophenone sulfonic acid containing the unit represented by the general formula:

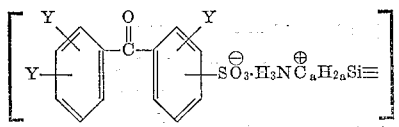

wherein Y represents a member selected from the group consisting of hydrogen atoms, hydroxyl radicals, alkyl radicals, alkoxy radicals, nitro radicals, and dialkylamino radicals; and $a$ is an integer having a value of at least 3.

2. An improved ultraviolet light absorbing composition as claimed in claim 1 wherein the base member is a glass article.

3. An improved ultraviolet light absorbing composition as claimed in claim 1 wherein the base member is a plastic article.

4. An improved ultraviolet light absorbing composition comprising a base material and a silicon-containing amine salt of a benzophenone sulfonic acid selected from the group of silane amine salts represented by the general formula:

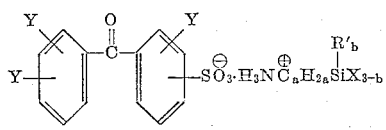

wherein Y represents a member selected from the group consisting of hydrogen atoms, hydroxyl radicals, alkyl radicals, alkoxy radicals, nitro radicals, and dialkylamino radicals; R' represents a member selected from the group consisting of hydrocarbon radicals; X represents a member selected from the group consisting of alkoxy radicals, and aryloxy radicals; $a$ is an integer having a value of at least 3; and $b$ is an integer having a value of from 1 to 3.

5. An improved ultraviolet light absorbing composition comprising a base material and a siloxane of a silicon-containing amine salt of a benzophenone sulfonic acid selected from the group of siloxanes containing the unit represented by the general formula:

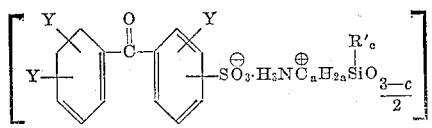

wherein Y represents a member selected from the group consisting of hydrogen atoms, hydroxyl radicals, alkyl radicals, alkoxy radicals, nitro radicals, and dialkylamino radicals; R' represents a member selected from the group consisting of hydrocarbon radicals; $a$ is an integer having a value of at least 3; and $c$ is an integer having a value of from 0 to 2.

6. An improved ultraviolet light absorbing composition as claimed in claim 4, wherein the base material is a glass article.

7. An improved ultraviolet light absorbing composition as claimed in claim 5, wherein the base material is a glass article.

8. An improved composition of matter comprising a plastic article and a stabilizing amount, sufficient to stabilize the plastic against ultraviolet light degradation, of a silicon-containing amine salt of a benzophenone sulfonic acid selected from the group of silane amine salts represented by the general formula:

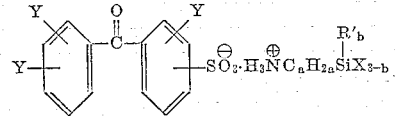

wherein Y represents a member selected from the group consisting of hydrogen atoms, hydroxyl radicals, alkyl radicals, alkoxy radicals, nitro radicals, and dialkylamino radicals; R' represents a member selected from the group consisting of hydrocarbon radicals; X represents a member selected from the group consisting of alkoxy radicals, and aryloxy radicals; $a$ is an integer having a value of at least 3; and $b$ is an integer having a value of from 1 to 3.

9. An improved composition of matter comprising a plastic article and a stabilizing amount, sufficient to stabilize the plastic against ultraviolet light degradation, of a siloxane of a silicon-containing amine sale of a benzophenone sulfonic acid selected from the group consisting of siloxane amine salts containing the unit represented by the general formula:

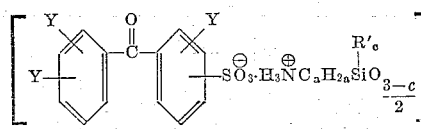

wherein Y represents a member selected from the group consisting of hydrogen atoms, hydroxyl radicals, alkyl radicals, alkoxy radicals, nitro radicals, and dialkylamino radicals; R' represents a member selected from the group consisting of hydrocarbon radicals; $a$ is an integer having a value of at least 3; and $c$ is an integer having a value of from 0 to 2.

10. An ultraviolet light absorbing composition of matter comprising a glass base material and a film thereon of a siloxane containing unit represented by the general formula:

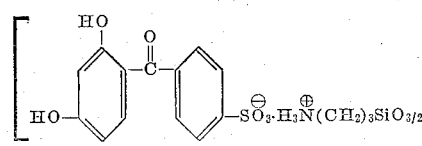

11. An ultraviolet light absorbing composition of matter comprising a glass base material and a film thereon of a siloxane containing the unit represented by the general formula:

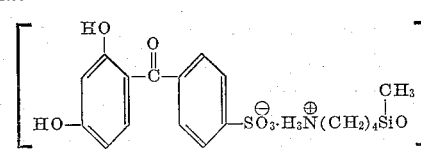

12. An ultraviolet light absorbing composition of matter comprising a glass base material and a film thereon of a siloxane copolymer containing units represented by the following formula:

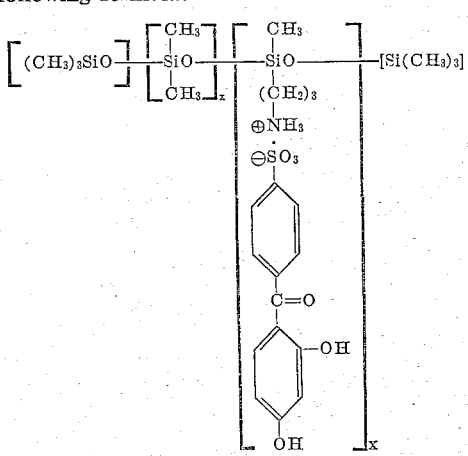

wherein $x$ is an integer.

13. A process for producing glass articles opaque to ultraviolet light radiation, which comprises coating the surface of said glass article on at least one side thereof with a silicon-containing amine salt of a benzophenone sulfonic acid containing the unit represented by the general formula:

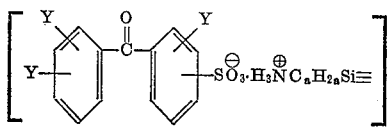

wherein Y and $a$ have the same meanings as claimed in claim 1, and heating said coated glass article at a temperature of at least about 150° C. for a period of at least about 10 minutes.

14. A process for producing glass articles opaque to ultraviolet light radiation, which comprises coating the surface of said glass article on at least one side thereof with a silicon-containing amine salt of a benzophenone sulfonic acid selected from the group of silane amine salts represented by the general formula:

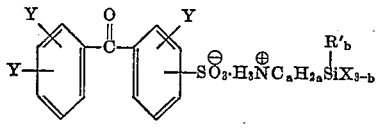

wherein Y, $a$ and $b$ have the same meanings as claimed in claim 4, and heating said coated glass article at a temperature of at least about 150° C. for a period of at least about 10 minutes.

15. A process for producing glass articles opaque to ultraviolet light radiation, which comprises coating the surface of said glass article on at least one side thereof with a siloxane of a silicon-containing amine salt of a benzophenone sulfonic acid selected from the group of siloxanes containing the unit represented by the general formula:

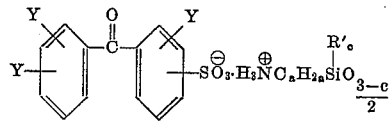

wherein Y, $a$ and $c$ have the same meanings as claimed in claim 5, and heating said coated glass article at a temperature of at least about 150° C. for a period of at least about 10 minutes.

References Cited in the file of this patent

UNITED STATES PATENTS

| | | |
|---|---|---|
| 2,043,860 | Morgan | June 9, 1936 |
| 2,134,947 | Isermann | Nov. 1, 1938 |
| 2,334,348 | Miglarese | Nov. 16, 1943 |
| 2,686,812 | Wynn et al. | Aug. 17, 1954 |
| 2,763,566 | Van Allan | Sept. 18, 1956 |

OTHER REFERENCES

Spier et al.: "Jour. Am. Chem. Soc.," volume 78 (May 20, 1956), pages 2278–81.

UNITED STATES PATENT OFFICE
Certificate of Correction

Patent No. 2,950,986

August 30, 1960

Donald L. Bailey et al.

It is hereby certified that error appears in the above numbered patent requiring correction and that the said Letters Patent should read as corrected below.

Column 1, lines 50 to 55, the formula should appear as shown below instead of as in the patent:

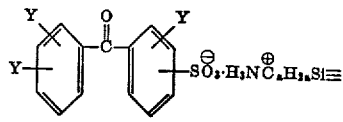

column 5, line 59, for "patrs" read —parts—; line 60 for "silicon" read —silicone—; column 7, lines 45 to 49, for the left-hand portion of the formula reading

Signed and sealed this 9th day of May 1961.

[SEAL]
Attest:
ERNEST W. SWIDER,
*Attesting Officer.*

DAVID L. LADD,
*Commissioner of Patents.*